United States Patent
Kim et al.

(10) Patent No.: US 9,995,832 B2
(45) Date of Patent: Jun. 12, 2018

(54) RADIATION DETECTOR AND RADIATION IMAGING APPARATUS INCLUDING THE SAME

(71) Applicant: SAMSUNG ELECTRONICS CO., LTD., Suwon-si (KR)

(72) Inventors: Young Kim, Yongin-si (KR); Jae-Chul Park, Yangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 14/972,906

(22) Filed: Dec. 17, 2015

(65) Prior Publication Data

US 2016/0209519 A1    Jul. 21, 2016

(30) Foreign Application Priority Data

Jan. 15, 2015  (KR) .................... 10-2015-0007443

(51) Int. Cl.
  *G01T 1/24* (2006.01)

(52) U.S. Cl.
  CPC .............. *G01T 1/241* (2013.01); *G01T 1/244* (2013.01); *G01T 1/247* (2013.01)

(58) Field of Classification Search
  CPC .................................................... G01T 1/241
  See application file for complete search history.

(56) References Cited

U.S. PATENT DOCUMENTS

| | | | |
|---|---|---|---|
| 6,353,229 B1 | 3/2002 | Polischuk et al. | |
| 6,399,950 B1* | 6/2002 | Kimura | G01T 1/24 250/370.09 |
| 7,888,648 B2 | 2/2011 | Seino et al. | |
| 2004/0136493 A1 | 7/2004 | Konno et al. | |
| 2007/0122543 A1* | 5/2007 | Yanoff | G01T 1/24 427/64 |
| 2008/0292056 A1 | 11/2008 | Marar | |
| 2010/0032579 A1* | 2/2010 | Chen | G01T 1/24 250/370.13 |
| 2012/0181434 A1* | 7/2012 | Sawada | G01T 1/2002 250/361 R |
| 2015/0179933 A1* | 6/2015 | Mathur | H01L 45/00 257/2 |

* cited by examiner

*Primary Examiner* — David Porta
*Assistant Examiner* — Jeremy S Valentiner
(74) *Attorney, Agent, or Firm* — Sughrue Mion, PLLC

(57) ABSTRACT

A radiation detector includes: a radiation detecting module including a photoconductive layer containing at least one heavy metal; a voltage controller configured to detect current flowing through the photoconductive layer and control application of a voltage to the photoconductive layer based on the detected current; and a sealing part configured to seal the photoconductive layer and surround a portion of the radiation detecting module.

18 Claims, 14 Drawing Sheets

RADIATION DETECTOR AND RADIATION IMAGING APPARATUS INCLUDING THE SAME

CROSS-REFERENCE TO RELATED APPLICATION

This application claims priority from Korean Patent Application No. 10-2015-0007443, filed on Jan. 15, 2015, in the Korean Intellectual Property Office, the disclosure of which is incorporated herein in its entirety by reference.

BACKGROUND

1. Field

Apparatuses and methods consistent with exemplary embodiments relate to radiation detectors and radiation imaging apparatuses including the same.

2. Description of the Related Art

Due to its high penetrating power, radiation such as X-rays and gamma (γ) rays is used to observe an internal structure of an object, and thus has become an important tool in the fields of medicine, non-destructive testing, etc. The amount of radiation penetrating an object may vary according to a density of the object, and such a difference in the amount of penetrating radiation is measured to aid in the visualization of the internal area of the object.

To detect a difference in the amount of radiation that penetrates an object, a photoconductor, i.e., a photoelectric conversion material, may be used. When radiation is emitted onto a photoconductor, electron-hole pairs may be produced in the photoconductor, which may then be separated into electrons and holes, and converted into electrical signals. The amount of electric charges generated in the photoconductor may vary according to the intensity of radiation absorbed by the photoconductor. Such a difference in the amount of electric charges may be used to image the object.

SUMMARY

One or more exemplary embodiments provide a radiation detector configured to solve problems that may arise due to an overcurrent flowing through a photoconductive layer containing a heavy metal and radiation imaging apparatuses including the radiation detectors.

According to an aspect of an exemplary embodiment, a radiation detector includes: a radiation detecting module including a photoconductive layer containing at least one of heavy metal; a voltage controller configured to detect current flowing through the photoconductive layer and control application of a voltage to the photoconductive layer based on the detected current; and a sealing part configured to seal the photoconductive layer and surround at least a portion of the radiation detecting module.

The heavy metal may be a metal having a specific gravity greater than or equal to 4.

The heavy metal may include at least one selected from the group consisting of mercury (Hg), cadmium (Cd), lead (Pb), titanium (Ti), and bismuth (Bi).

The photoconductive layer may include at least one selected from the group consisting of mercury(II) iodide ($HgI_2$), lead(II) iodide ($PbI_2$), lead(II) oxide (PbO), cadmium telluride (CdTe), cadmium zinc telluride (CdZnTe), cadmium sulfide (CdS), titanium bromide (TiBr), bismuth triiodide ($BiI_3$), and any mixtures thereof.

The voltage controller may include a current detector configured to detect current flowing in the photoconductive layer; and a voltage blocking unit configured to block a voltage being applied to the photoconductive layer based on the current detected by the current detector.

The voltage blocking unit may block the voltage being applied to the photoconductive layer if the current detected by the current detector is greater than an allowable current.

The allowable current may be a product of an allowable current density of the photoconductive layer and an area of the photoconductive layer, and the allowable current density of the photoconductive layer may be less than or equal to 10 micro amperes ($\mu A$)/$cm^2$.

The sealing part may be configured to block decomposed matter, generated due to decomposition of material in the photoconductive layer, from leaking out.

The decomposed matter may include at least one selected from the group consisting of Hg, Cd, Pb, Ti, and Bi.

The radiation detecting module may further include an array substrate that is disposed on one side of the photoconductive layer and includes a plurality of first electrodes and a second electrode that is disposed on another side of the photoconductive layer to face the array substrate.

The photoconductive layer may include a first surface having the second electrode disposed thereon, a second surface having the array substrate disposed thereon, and side surfaces connecting the first and second surfaces, and the sealing part may surround the side surfaces of the photoconductive layer.

The array substrate may include a first surface having the photoconductive layer disposed thereon, a second surface opposite the first surface, and side surfaces connecting the first and second surfaces, and the sealing part may surround the side surfaces and the second surface of the array substrate.

The second electrode may include a second surface having the photoconductive layer disposed thereon, a first surface opposite the second surface, and side surfaces connecting the first and second surfaces, and the sealing part may surround the side surfaces of the second electrode.

The sealing part may include: a first sealing member configured to surround the photoconductive layer; and a second sealing member that is in elastic contact with the first sealing member and surrounds at least a portion of the array substrate.

The radiation detector may further include a driving integrated circuit (IC) that is connected to the array substrate and disposed between the first and second sealing members, and at least one of the first and second sealing members may be formed of an elastic material to tightly contact the driving IC.

The radiation detector may further include a connection wire that is connected to the second electrode and disposed between the first and second sealing members, and at least one of the first and second sealing members may be formed of an elastic material to tightly contact the connection wire.

The first and second sealing members may each include silicone.

The sealing part may further include a sub-sealing member that is disposed between the first and second sealing members, surrounds the connection wire, and is formed of an elastic material to tightly contact the first and second sealing members and the connection wire.

The sub-sealing member may include silicone.

The radiation detector may be an X-ray detector or a gamma (γ) ray detector.

According to an aspect of another exemplary embodiment, a radiation imaging apparatus includes: a radiation generator configured to emit radiation toward an object; and the radiation detector that is disposed to face the radiation generator with the object interposed therebetween and detects radiation that has passed through the object.

BRIEF DESCRIPTION OF THE DRAWINGS

The above and/or other aspects will become more apparent by describing certain exemplary embodiments, with reference to the accompanying drawings, in which.

DETAILED DESCRIPTION

Figure 1:
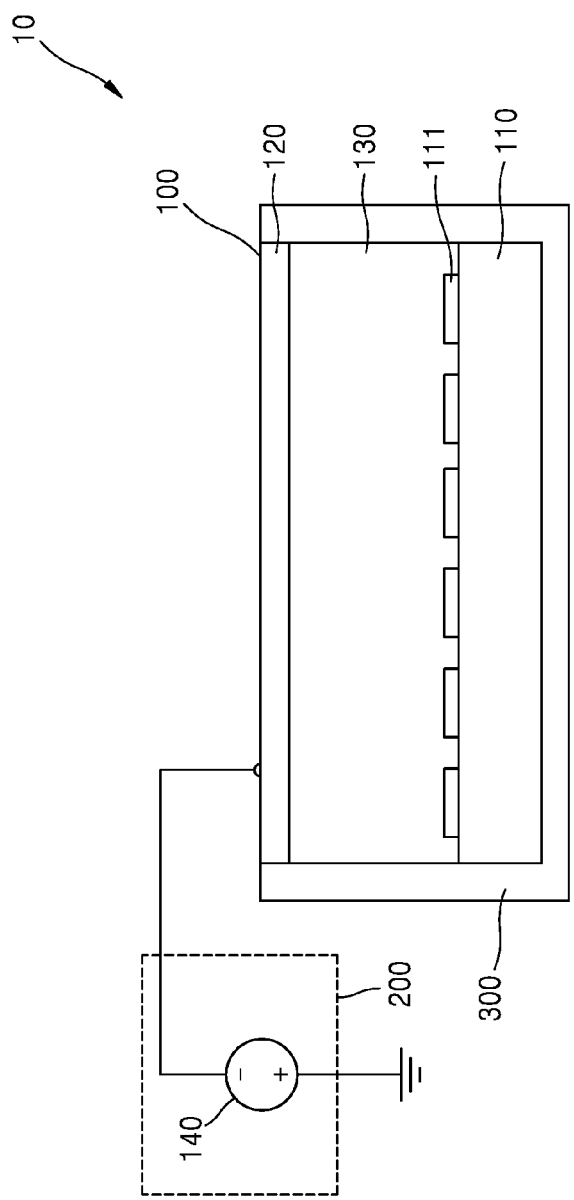
FIG. 1 is a schematic cross-sectional view of a radiation detector according to an exemplary embodiment.

Certain exemplary embodiments are described below with reference to the accompanying drawings.

In the following description, same drawing reference numerals are used for the same elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Expressions such as "at least one of," when preceding a list of elements, modify the entire list of elements and do not modify the individual elements of the list.

Referring to FIG. 1, the radiation detector 10 according to the present exemplary embodiment may include a radiation detecting module 100 having a photoconductive layer 130. The radiation detecting module 100 may further include the array substrate 110 having a plurality of first electrodes 111, a second electrode 120 separated from the array substrate 110, and a voltage source 140 for applying a voltage to the photoconductive layer 130.

The photoconductive layer 130 may also be referred to as a 'photoelectric conversion layer.' The first electrodes 111 may be referred to as "bottom electrodes" or "pixel electrodes", and the second electrode 120 may be referred to as a "top electrode".

The voltage source 140 applies a voltage between the first electrodes 111 and the second electrode 120 to create an electric field across the photoconductive layer 130. Although FIG. 1 shows an example where a negative (−) voltage is applied to the second electrode 120 for convenience, negative (−) and positive (+) voltages may be respectively applied to the second electrode 120 and the first electrodes 111.

The radiation detector 10 may detect radiation that has passed through an object using the electric field of the photoconductive layer 130. The radiation may be an X-ray or a gamma (γ)-ray. The photoconductive layer 130 may have a particle-in-binder (PIB) structure in which photoconductive particles are mixed with a binder. The photoconductive particles may provide photoconductive properties, i.e., photoelectric conversion properties, to the photoconductive layer 130, and the binder may be dispersed in the photoconductive particles to provide adhesion to the photoconductive particles. The binder may facilitate formation of the photoconductive layer 130. The photoconductive layer 130 may be formed by coating a paste including photoconductive powders, a binder material, and a solvent on a substrate and heat treating (drying) the substrate. The photoconductive layer 130 may have a thickness between about 100 μm and about 250 μm, for example, between about 120 μm and about 180 μm.

Photoconductive particles may include at least one heavy metal which may be a metal having a specific gravity greater than or equal to 4. For example, the heavy metal may include at least of mercury (Hg), cadmium (Cd), lead (Pb), titanium (Ti), and bismuth (Bi). Thus, the photoconductive particles may include at least of mercury(II) iodide ($HgI_2$), lead(II) iodide ($PbI_2$), lead(II) oxide (PbO), titanium bromide (TiBr), cadmium telluride (CdTe), cadmium zinc telluride (CdZnTe), cadmium sulfide (CdS), bismuth triiodide ($BiI_3$), and any mixtures thereof. These materials may absorb radiation well, even when having small thicknesses, due to their high atomic weights and densities and exhibit excellent photoconductive properties due to their low radiation ionization energies. In particular, $HgI_2$ has excellent photoconductive properties.

A binder is mixed with the photoconductive particles to provide an adhesive force and may include an organic polymer material. For example, the binder may include at least of a polyvinyl butyral (PVB)-based material, an acryl-based material, a polyester-based material, a phenoxy-based material, a polyvinyl formal-based material, a polyamide-based material, a polystyrene-based material, a polycarbonate-based material, a polyvinyl acetate-based material, a polyurethane-based material, an epoxy-based material, and any mixtures thereof.

Since the photoconductive layer 130 may be formed from a paste by performing low temperature heat treatment (drying) on the paste at a temperature lower than or equal to about 150° C., the binder is not removed and remains after the heat treatment. The type and content of the binder may affect the properties (sensitivity, etc.) of the photoconductive layer 130.

The photoconductive layer 130 may further include a predetermined additive. The additive may include at least one selected from the group consisting of a dispersant, a defoamer, and a leveling agent. The amount of the additive with respect to a mixture of photoconductive particles, a binder, and the additive is less than or equal to about 3 wt %, e.g., in the range of about 0.1 to about 3 wt %.

The array substrate 110 including the plurality of first electrodes 111 is disposed on one side of the photoconductive layer 130, and the second electrode is disposed on another side of the photoconductive layer 130 to face the array substrate 110.

Figure 2:
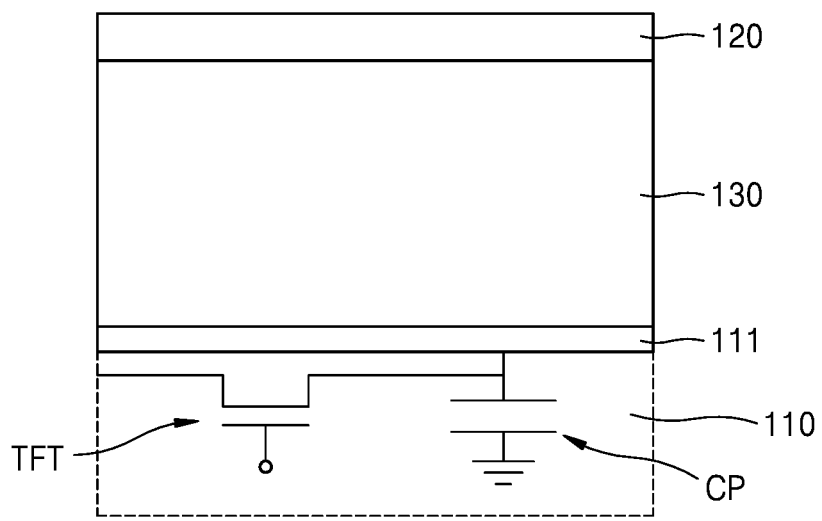
FIG. 2 is a cross-sectional view showing a conceptual structure of an array substrate of a radiation detector according to an exemplary embodiment.

Referring to FIG. 2, the array substrate 110 may include a capacitor CP and a thin film transistor TFT coupled to the first electrodes 111. The capacitor CP and the TFT may be electrically connected to each other.

When radiation is irradiated on the photoconductive layer 130, a predetermined voltage is generated in the capacitor CP. The predetermined voltage that is applied to the capacitor CP may vary depending on the amount of radiation irradiated on the photoconductive layer 130. The predetermined voltage may be read as an electrical signal by operation of the TFT.

Figure 3:
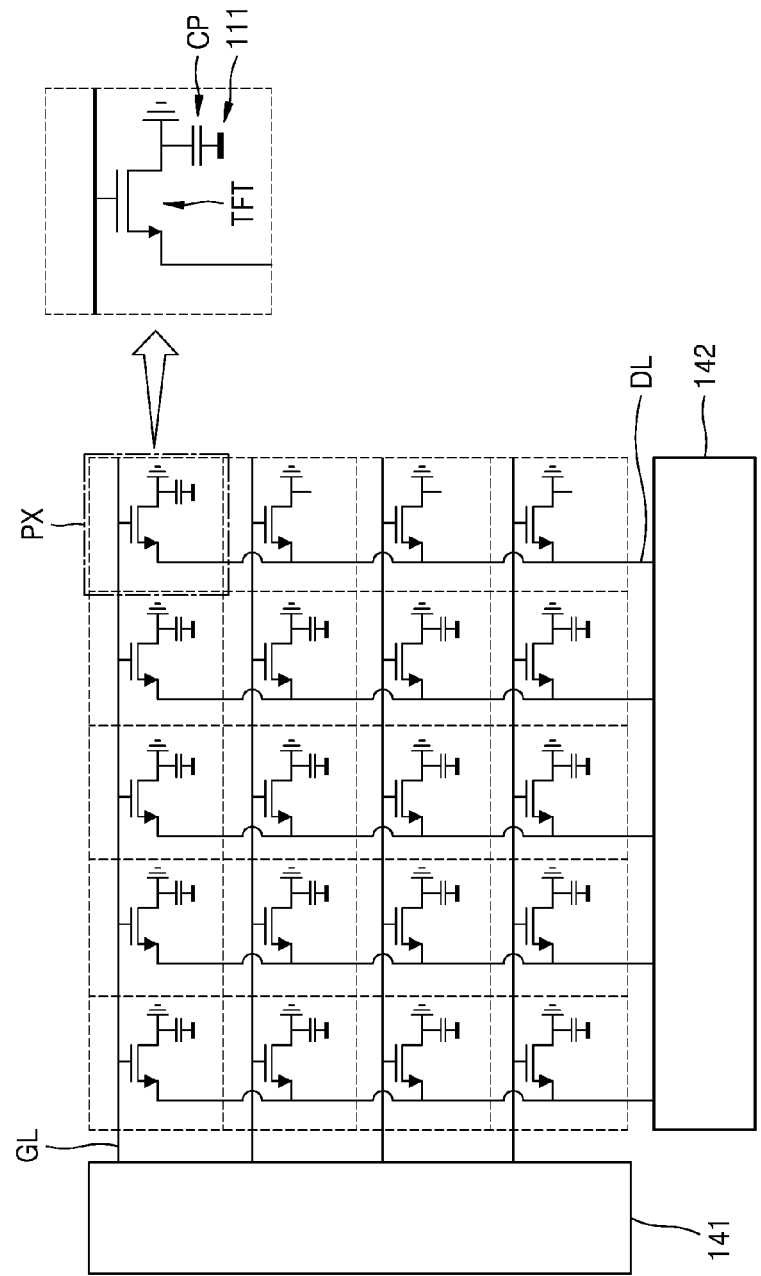
FIG. 3 is a circuit diagram illustrating a circuit configuration for a radiation detector according to an exemplary embodiment.

Referring to FIG. 3, the plurality of first electrodes 111, a plurality of capacitors CP, and a plurality of TFTs may be formed on the array substrate 110. A plurality of gate lines GL extend along a first direction and may be separated from one another by a predetermined distance, and a plurality of data lines DL intersecting the plurality of gate lines GL. A TFT may be located at each of intersections of the plurality of gate lines GL and the plurality of data lines DL. A capacitor CP may be connected to each of the plurality of TFTs. The plurality of capacitors CP may be respectively connected to corresponding first electrodes 111 as shown in FIG. 2. A TFT, a capacitor CP connected to the TFT, and the first electrode 111 may form one pixel region PX. A plurality of pixel regions PX may be arranged in a plurality of rows and a plurality of columns.

Driving integrated circuits (ICs) 141 and 142 may be connected to the array substrate 110. The driving ICs 141 and 142 may include a gate driver and a readout circuit. The gate driver is connected to the plurality of gate lines GL formed on the array substrate 110, and the readout circuit may be connected to the plurality of data lines DL formed on the array substrate 110. Since the detailed constructions of the gate driver and the readout circuit are known to those skilled in the art, detailed descriptions thereof are omitted.

The radiation detecting module 100 having the plurality of pixel regions PX as described above detects radiation for each pixel region PX. The amount of emitted radiation may vary for each pixel region PX and accordingly, an electrical signal obtained by conversion in a pixel region PX may vary. Such a difference in the amount of electric signal may be used to image the object O.

Although not shown in FIGS. 1 and 2, a passivation layer may be formed on the second electrode 120 and prevent oxidation of the second electrode 120.

Figure 4:
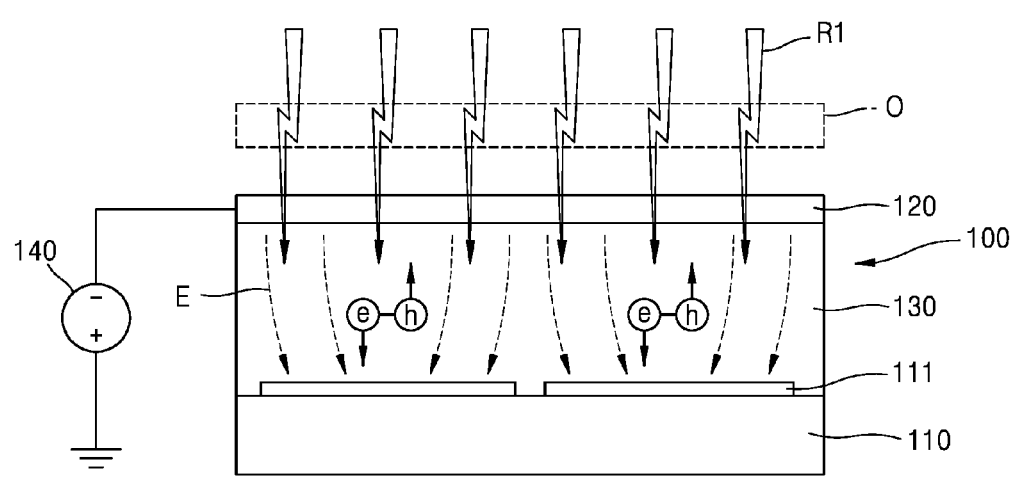
FIG. 4 is a diagram for explaining a normal operating state of a radiation detector according to an exemplary embodiment.

FIG. 4 is a diagram for explaining a normal operating state of the radiation detector 10 according to an exemplary embodiment.

Referring to FIG. 4, when a voltage is applied to the photoconductive layer 130 by the voltage source 140, an electric field E is created in the photoconductive layer 130.

A voltage applied by the voltage source 140 may be a high voltage. By applying a high voltage to the photoconductive layer 130, the sensitivity of the photoconductive layer 130 to radiation may be improved. The high voltage may be in the range of several tens to several thousands of volts. The magnitude of a high voltage that is required for detecting radiation may vary depending on a material of the photoconductive layer 130. For example, if the photoconductive layer 130 is formed of $HgI_2$, a high voltage of about 50 V to about 200 V may be used.

When radiation R1 that has passed through the object O is irradiated on the photoconductive layer 130 in which the electric field E is created, electron-hole pairs are generated in the photoconductive layer 130. The electron-hole pairs are separated into electrons e and holes h that move to the first and second electrodes, respectively. This movement of the electrons e and holes h may be converted into electrical signals. For example, a predetermined voltage may be generated in the capacitor CP. The predetermined voltage that is applied to the capacitor CP may vary depending on the amount of radiation emitted on the photoconductive layer 130. The predetermined voltage may be read as an electrical signal by operation of the TFT.

An electrical signal may change for each pixel region PX according to the amount of penetrating radiation. For example, the amount of electric charges generated in the pixel region PX may vary. Based on the difference in the electrical signal, the object O may be imaged.

As described above, when radiation is incident on the photoconductive layer 130 where the electric field E is formed, electron-hole pairs may be generated in the photoconductive layer 130 and then separated into electrons and holes. As the electrons and holes move, current flows through the photoconductive layer 130.

As current per unit area of the photoconductive layer 130 becomes higher, the photoconductive layer 130 becomes hotter. In other words, as the current density in the photoconductive layer 130 increases, the temperature of the photoconductive layer 130 increases.

If the current density in the photoconductive layer 130 substantially increases until it is outside a normal range, the temperature of the photoconductive layer 130 may also substantially increase so that a material forming the photoconductive layer 130 may be decomposed due to heat.

Problems that may occur when current density in the photoconductive layer 130 falls outside the normal range will now be described in detail. The problems are described mainly with respect to current flowing in the photoconductive layer 130 in consideration of a difficulty in directly measuring current density for each unit area of the photoconductive layer 130.

Figure 5A:
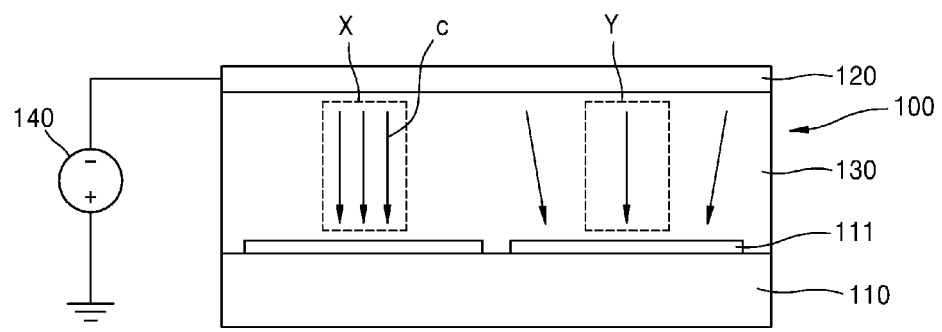
FIGS. 5A and 5B are conceptual diagrams illustrating flow of an overcurrent through a portion of a photoconductive layer and generation of decomposed matter due to the overcurrent.
Figure 5B:
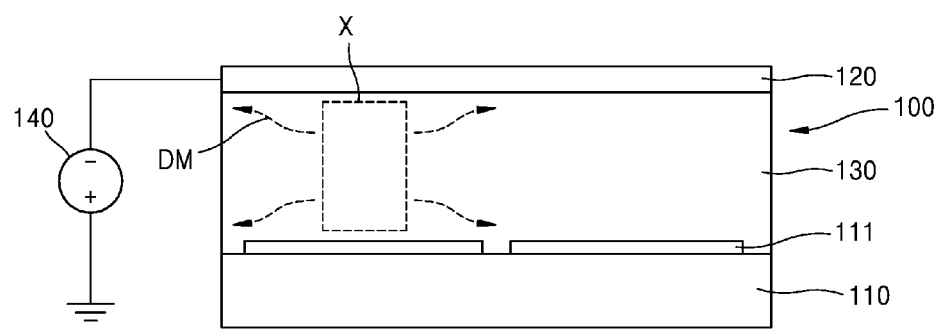

FIGS. 5A and 5B are conceptual diagrams illustrating flow of an overcurrent through a portion of the photoconductive layer 130 and generation of decomposed matter DM due to the overcurrent.

Referring to FIG. 5A, the overcurrent may flow through a region X of the photoconductive layer 130, unlike another region Y thereof. A current c may be concentrated in the region X of the photoconductive layer 130. Due to this concentration, current density in the region X of the photoconductive layer 130 may fall outside a normal range. Thus, the region X of the photoconductive layer 130 may be heated to a temperature greater than or equal to several hundreds of degrees.

Referring to FIG. 5B, as the region X of the photoconductive layer 130 is heated to a temperature greater than or equal to several hundreds of degrees, a material of the photoconductive layer 130 may be decomposed by heat in the region X. In other words, decomposed matter DM resulting from decomposition of the material of the photoconductive layer 130 may be generated in the photoconductive layer 130. As shown in FIG. 5B, the decomposed matter DM may also be generated in the gas phase.

In case of that the photoconductive layer 130 includes a heavy metal, the decomposed matter DM generated in the photoconductive layer 130 may also include the heavy metal which may be a hazardous substance that is hazardous to a human body.

The photoconductive layer 130 may include at least of $HgI_2$, $PbI_2$, PbO, TiBr, CdTe, CdZnTe, CdS, $BiI_3$, and any mixtures thereof. In this case, the decomposed matter DM generated in the photoconductive layer 130 may include at least of Hg, Cd, Pb, Ti, and Bi. In other words, a hazardous substance such as Hg, Cd, and/or Pb may be generated in the photoconductive layer 130.

For example, in case of that the photoconductive layer 130 includes $HgI_2$, the decomposed matter DM generated in the photoconductive layer 130 may contain Hg when the photoconductive layer 130 is heated to a temperature greater than or equal to 200° C.

The Hg may be accumulated in a kidney and a liver when introduced into a human body and hamper functions of the kidney and liver. Furthermore, when a level of Hg accumulated in the body is outside a predetermined range, e.g., greater than or equal to 30 parts per million (ppm), symptoms of Hg poisoning such as ataxia caused by chronic nervous system diseases, speech disturbance, and hearing impairment may occur. In extreme cases, Hg poisoning leads to quadriplegia and death. In addition, for pregnant women, Hg poisoning may cause disorders in a nervous system of the fetus.

A hazardous substance in the gas phase may be absorbed into the human body through the skin as well as the human respiratory organ. Thus, the rate of absorption of the hazardous substance into the body may increase.

Figure 6A:
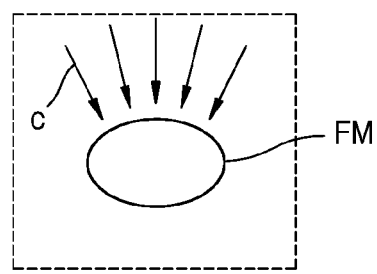
FIGS. 6A and 6B are diagrams for explaining the cause of an overcurrent flowing through a photoconductive layer.
Figure 6B:
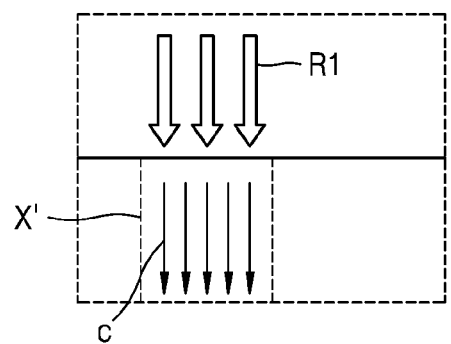

FIGS. 6A and 6B are diagrams for explaining the cause of overcurrent flowing through the photoconductive layer 130. Overcurrent may flow through the photoconductive layer 130 for various reasons.

For example, as shown in FIG. 6A, during formation of the photoconductive layer 130, conductive foreign matter FM may be inadvertently included in a region of the photoconductive layer 130. The conductive foreign matter FM has higher conductivity than the photoconductive layer 130. In other words, the region of the photoconductive layer 130 containing the conductive foreign matter FM has lower resistance than the remaining regions thereof. Thus, if a current c flows in the photoconductive layer 130 containing the conductive foreign matter FM, the current c may be concentrated in the region of the photoconductive layer 130 containing the conductive foreign matter FM as indicated by arrows, thereby causing an overcurrent to flow in the region of the photoconductive layer 130.

As another example, as shown in FIG. 6B, radiation R1 may be emitted with high intensity onto a region X' of the photoconductive layer 130, thereby causing aging or degradation to be concentrated in the region X' of the photoconductive layer 130. Thus, the current c may be concentrated in the region X' on which the radiation R1 is emitted with high intensity, thereby causing the overcurrent to flow therein.

Figure 7A:
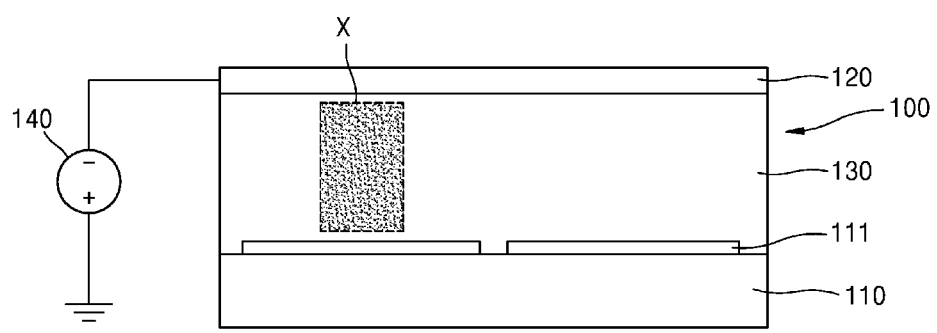
FIGS. 7A and 7B are diagrams for conceptually explaining a phenomenon that may occur after generation of decomposed matter due to an overcurrent flowing through a photoconductive layer.
Figure 7B:
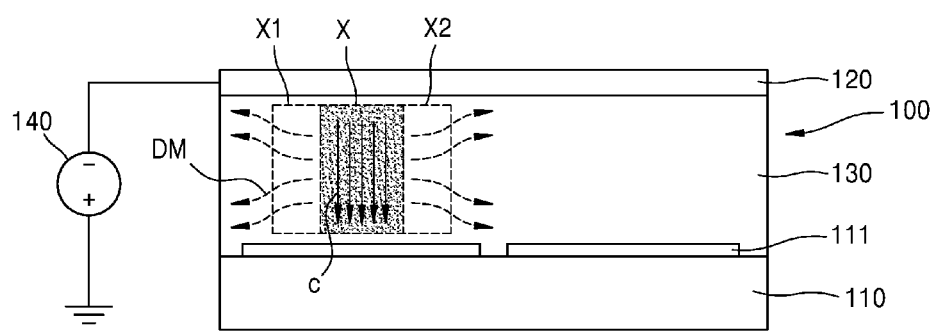

FIGS. 7A and 7B are diagrams for conceptually explaining a phenomenon that may occur after generation of a decomposed matter DM due to overcurrent flowing through the photoconductive layer 130.

If decomposed matter DM is generated in a region X of the photoconductive layer 130 as described with reference to FIG. 5B, physical properties of the region X of the photoconductive layer 130 may be changed as shown in FIG. 7A. For example, conductivity of the region X of the photoconductive layer 130 may increase.

As the conductivity of the region X of the photoconductive layer 130 increases, resistance thereof decreases. Due to the decrease in resistance, when a current c flows in the photoconductive layer 130, an overcurrent having a magnitude greater than that of the previously-flown overcurrent flows in the region X of the photoconductive layer 130, as shown in FIG. 7B. Thus, the amount of decomposed matter DM generated in the region X of the photoconductive layer 130 may increase further, and accordingly, the physical properties of regions X1 and X2 adjacent to the region X may change.

The above-described process may occur repeatedly each time the current c flows, and thus an area corresponding to a region where overcurrent flows and the amount of generated decomposed matter DM may be further increased. In some cases, when the photoconductive layer 130 overheats, this may lead to fire or destruction of a radiation detecting module 100.

Figure 8A:
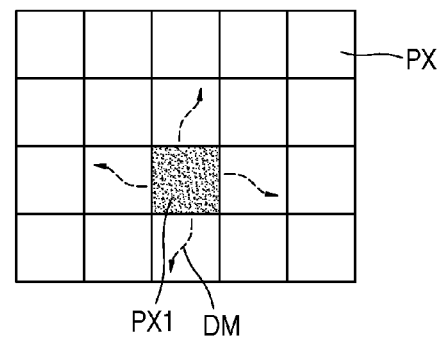
FIGS. 8A, 8B, and 8C are plan views illustrating phenomena that occur in a radiation detecting module when an overcurrent flows across a photoconductive layer.
Figure 8B:
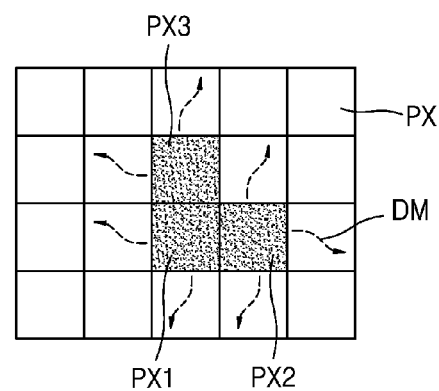
Figure 8C:
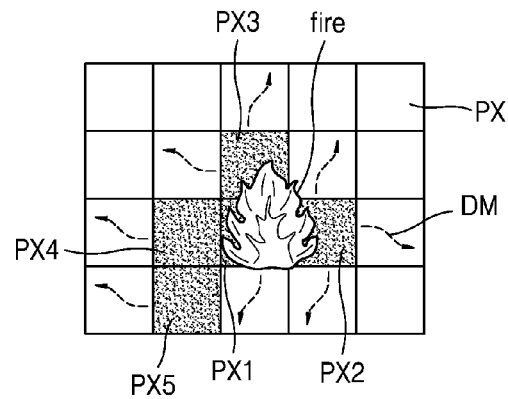

FIGS. 8A through 8C are plan views illustrating phenomena that occur in a radiation detecting module 100 when overcurrent flows across the photoconductive layer 130.

Referring to FIG. 8A, the radiation detecting module 100 may be divided into a plurality of pixel regions PX. When overcurrent flows in one pixel region PX1, decomposed matter DM resulting from decomposition of the photoconductive layer 130 may be generated in the pixel region PX1, and physical properties of the pixel region PX1 may change. For example, the conductivity of the pixel region PX1 may become higher than that of the remaining pixel regions PX.

Referring to FIGS. 8B and 8C, when current continues to flow in this state, decomposed matter DM may be generated in at least some of neighboring pixel regions, i. e., in pixel regions PX2, PX3, PX4, and PX5, and the conductivities of the pixel regions PX2 through PX5 may change. In some cases, at least some (e.g., pixel region PX1) of the pixel regions may be burnt as shown in FIG. 8C, which may lead to destruction of the radiation detecting module 100 due to fire.

To solve phenomena or problems that may occur when overcurrent flows in the photoconductive layer 130 as described above, the radiation detector 10 according to the present exemplary embodiment further includes two components which are a voltage controller 200 and a sealing part 300 as shown in FIG. 1.

Figure 9:
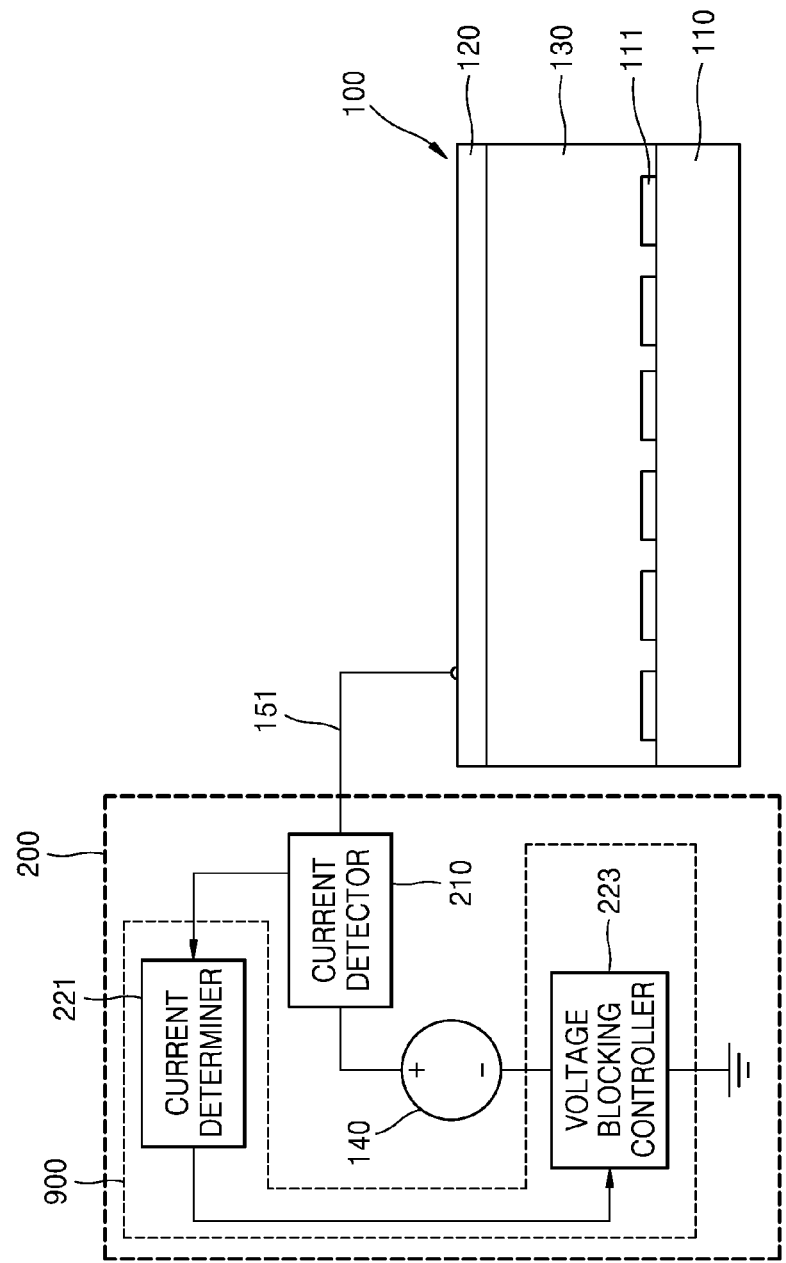
FIG. 9 is a conceptual diagram of a voltage controller according to an exemplary embodiment.
Figure 10:
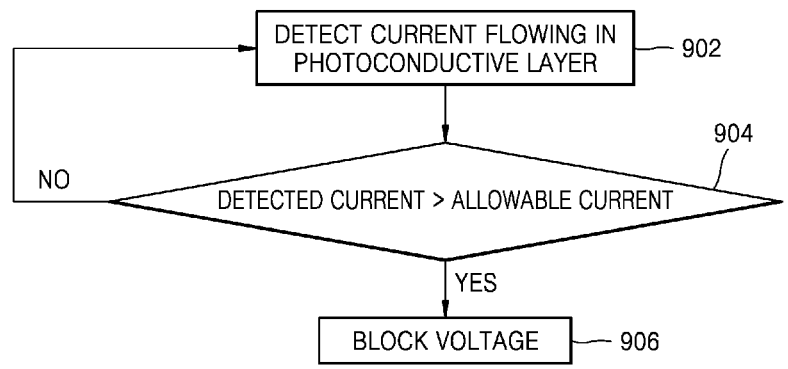
FIG. 10 is a flowchart of an operation of the voltage controller.

Referring to FIGS. 9 and 10, the voltage controller 200 detects current flowing in the photoconductive layer 130 (operation 902) and controls application of a voltage by the voltage source 140 based on the detected current. The voltage controller 200 may suppress overcurrent from flowing through the photoconductive layer 130 by determining whether to apply a voltage to the photoconductive layer 130 according to the current flowing in the photoconductive layer 130.

The voltage controller 200 includes a current detector 210, for example, a resistor, etc., for detecting current flowing in the photoconductive layer 130 and a voltage blocking circuit 900 for controlling blocking of a voltage based on the detected current.

The current detector 210 may be electrically connected to the second electrode 120 via a connection wire 151 and to a first terminal of the voltage source 140. The current detector 210 may detect current flowing in the photoconductive layer 130 via the second electrode 120. Since a detailed configuration of the current detector 210 is known to those skilled in the art, a detailed description thereof is omitted.

If current detected by the current detector 210 is greater than an allowable current (operation 904), the voltage blocking circuit 900 may block a voltage being applied to the photoconductive layer 130 (operation 906). The voltage blocking circuit 900 includes a current determiner 221, which is electrically connected to the current detector 210, and a voltage blocking controller 223, which is electrically connected between a second terminal of the voltage source 140 and a ground terminal. The voltage blocking controller 223 may receive, for example, an electrical signal or logic signal from the current determiner 221 and may block the application of the voltage by the voltage source 140.

The current determiner 221 determines whether a current detected by the current detector 210 falls outside an allowable current range of the photoconductive layer 130 (operation 904). For example, the current determiner 211 may determine whether the detected current is greater than allowable current of the photoconductive layer 130.

The allowable current of the photoconductive layer 130 may be defined as a product of an allowable current density of the photoconductive layer 130 and an area of the photoconductive layer 130.

An allowable current density of the photoconductive layer 130 may mean a current density at which the photoconductive layer 130 is not decomposed by heat despite current flowing in the photoconductive layer 130. The allowable current density of the photoconductive layer 130 may be less than or equal to about 10 micro ampere ($\mu A$)/$cm^2$, but is not limited thereto. The allowable current density of the photoconductive layer 130 may vary depending on the type of a material forming the photoconductive layer 130.

An area of the photoconductive layer 130 may be determined according to a particular purpose of the radiation detector 10 or other factors. For example, if the radiation detector 10 is applied to mammography, the photoconductive layer 130 may have an area of about 720 $cm^2$.

If the photoconductive layer 130 has an allowable current density that is less than or equal to about 10 $\mu A/cm^2$ and an area of about 720 $cm^2$, an allowable current of the photoconductive layer 130 may be less than or equal to about 7.2 mA.

If the current determiner 221 determines that detected current is greater than an allowable current, the voltage blocking controller 223 may blocks application of a voltage by the voltage source 140 (operation 906). On the other hand, if the detected current is less than or equal to the allowable current, the voltage blocking controller 223 maintain application of a voltage by the voltage source 140.

For example, if detected current exceeds about 7.2 mA, the voltage blocking circuit 900 may block a voltage being applied to the photoconductive layer 130. Otherwise, if the detected current is less than or equal to about 7.2 mA, the voltage blocking circuit 900 may maintain a voltage being applied to the photoconductive layer 130.

The voltage controller 200 may set a time interval between detection of current and controlling of a voltage to be less than several microseconds ($\mu secs$). For example, the voltage controller 200 may set a time interval between detection of current and controlling of a voltage to be less than about 10 $\mu secs$. Thus, generation of decomposed matter DM in the photoconductive layer 130 may be minimized during controlling of a voltage being applied to the photoconductive layer 130.

As described above, the voltage blocking circuit 900 may prevent or substantially eliminate an overcurrent greater than an allowable current flowing in the photoconductive layer 130 by controlling application of a voltage to the photoconductive layer 130 based on current flowing through the photoconductive layer 130.

Figure 11:
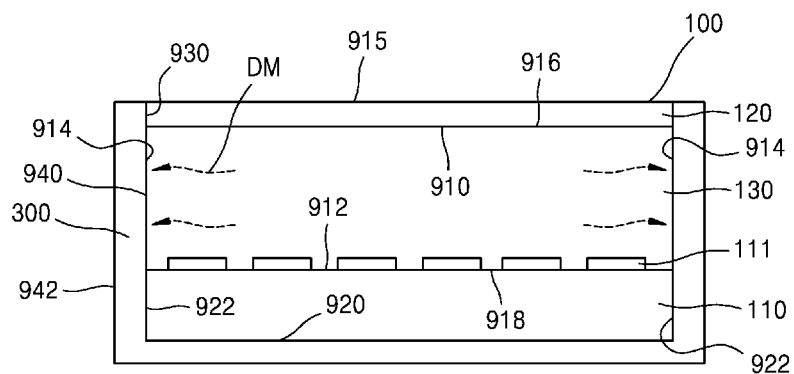
FIG. 11 illustrates a sealing part of a radiation detector according to an exemplary embodiment.

FIG. 11 shows an example of the sealing part 300 of the radiation detector 10, and a detailed shape thereof may vary according to a shape of the radiation detecting module 100 including the photoconductive layer 130.

Referring to FIG. 11, the sealing part 300 may be configured to prevent decomposed matter DM from the photoconductive layer 130 from leaking out. The sealing part 300 may surround at least a portion of the radiation detecting module 100 and hermetically seal the photoconductive layer 130.

The photoconductive layer 130 may include a first surface 910 having the second electrode 120 disposed thereon, a second surface 912 having the array substrate 110 disposed thereon, and side surfaces 914 connecting the first and second surfaces 910 and 912. The array substrate 110 may include a first surface 918 having the photoconductive layer 130 disposed thereon, a second surface 920 opposite the first surface, and side surfaces 922 connecting the first and second surfaces 918 and 920. The second electrode 120 may include a second surface 916 having the photoconductive layer 130 disposed thereon, a first surface 915 opposite the second surface 916, and side surfaces 930 connecting the first and second surfaces 915 and 916. The first and second surfaces of each above component may be referred to as top and bottom surfaces, respectively.

The sealing part 300 may surround the side surfaces 914 of the photoconductive layer 130. The sealing part 300 may prevent decomposed matter DM generated in the photoconductive layer 130 from leaking out by surrounding the side surfaces 914 of the photoconductive layer 130 through which the decomposed matter DM may otherwise be discharged.

The sealing part 300 may surround side surfaces 922 and a second surface 920 of the array substrate 110, to prevent the decomposed matter DM from leaking out through the array substrate 110.

The sealing part 300 may surround the side surfaces 930 of the second electrode 120, to prevent the decomposed matter DM from leaking out through the second electrode 120.

At least an inner side of the sealing part 300 may be elastically deformed. The inner side of the sealing part 300 may have a same size as or be smaller than an outer side of the radiation detecting module 100. Here, the size of the inner side of the sealing part 300 may be defined as the size of the inner side when not pressed by an external force. The elastically deformable sealing part 300 encloses the radiation detecting module 100, thereby preventing formation of a gap between the radiation detecting module 100 and the sealing part 300. Thus, the photoconductive layer 130 may be hermetically sealed by the sealing part 300.

By sealing the photoconductive layer 130, the sealing part 300 may prevent decomposed matter DM generated in the photoconductive layer 130 from escaping to the outside. The sealing part 300 has a physical structure that encloses the photoconductive layer 130, thereby preventing the decomposed matter DM from leaking out. Thus, even if the decomposed matter DM is generated in the photoconductive layer 130 despite the presence of the voltage controller 200, the radiation detector 10 is provided with the sealing part 300 to prevent the decomposed matter DM from leaking out.

At least an area extending along or disposed proximate the inner side 940 of the sealing part 300 may include silicone. However, both of the side areas extending along or disposed proximate the inner and outer sides 940, 942, respectively, of the sealing part 300 may be formed of the same material, but exemplary embodiments are not limited thereto, and the inner and outer sides may be formed of different materials. The inner side 940 of the sealing part 300 is a side facing the radiation detecting module 100, and the outer side 942 is a side opposite to the inner side.

However, the material of the sealing part 300 is not limited to silicone, and any other material may be used as long as it can be elastically deformable and block leakage of the decomposed matter DM. For example, the sealing part 300 may include at least one of polyurethane and fluorine.

Figure 12:
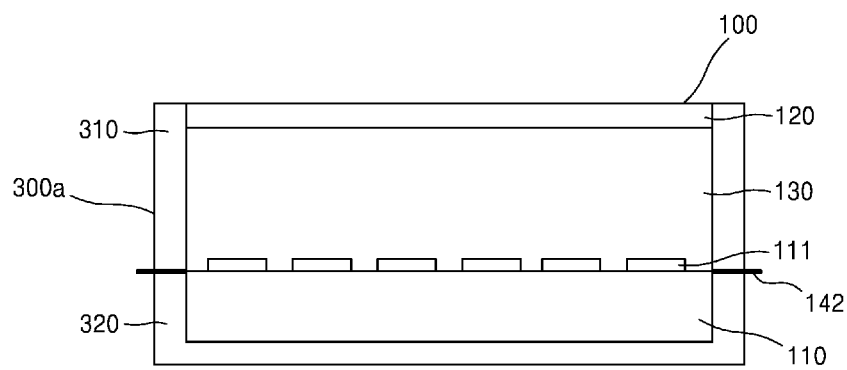
FIG. 12 illustrates a sealing part of a radiation detector according to an exemplary embodiment.

FIG. 12 illustrates another example of the sealing part 300a of the radiation detector 10. Referring to FIG. 12, the sealing part 300a may include first and second sealing members 310 and 320 that elastically contact each other.

The first sealing member 310 may surround the photoconductive layer 130 and at least a portion of the second electrode 120. The second sealing member 320 may further surround at least a portion of the array substrate 110. The first and second sealing members 310 and 320 may elastically contact each other to hermetically seal the photoconductive layer 130.

A connection wire (not shown) for connecting the second electrode 120 and the voltage source 140 and the driving ICs 141 and 142 connected to the array substrate 110 may be disposed between the first and second sealing members 310 and 320 that elastically contact each other. This arrangement may prevent leakage of the decomposed matter DM that would otherwise occur if the connection wire and the driving ICs 141 and 142 protrude out of the sealing part 300a.

Figure 13:
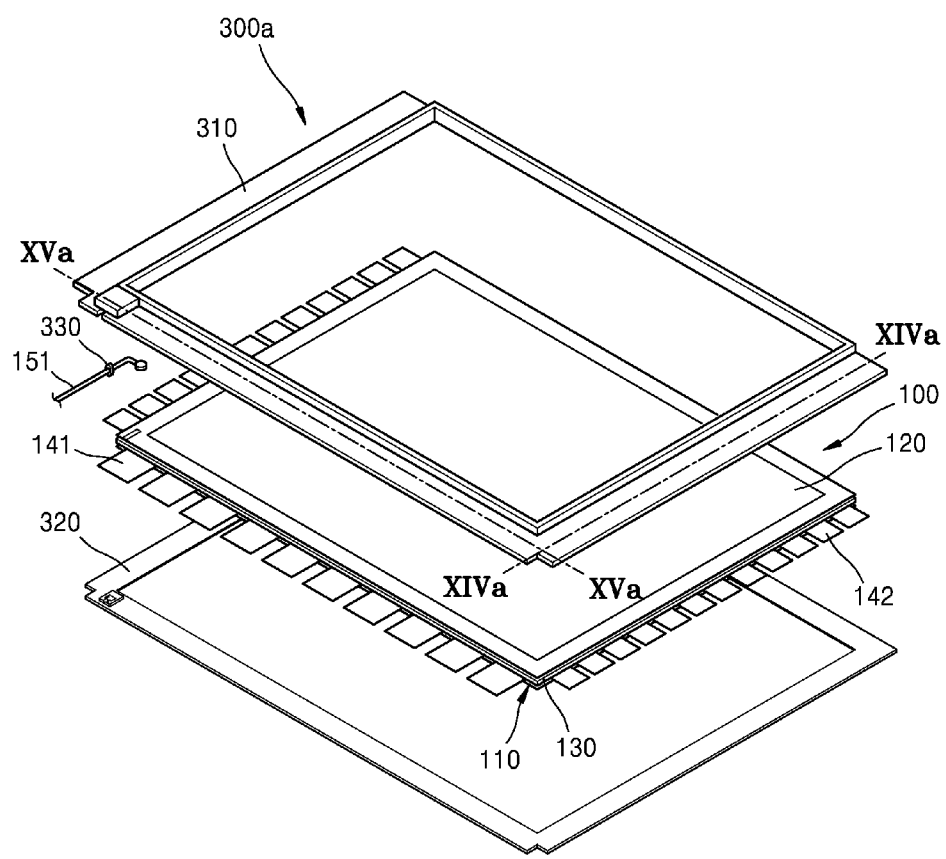
FIG. 13 is a perspective view of a radiation detector.
Figure 14A:
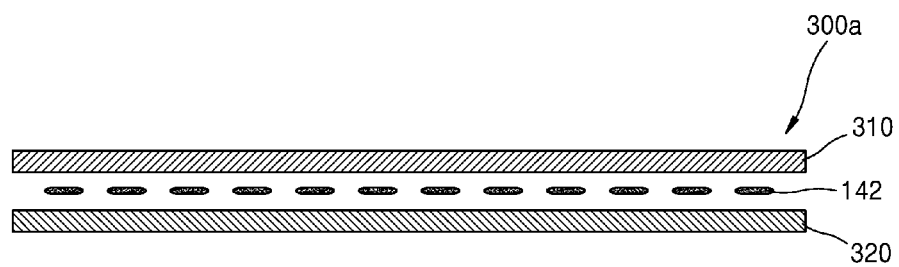
FIG. 14A is cross-sectional view taken along a line XIVa-XIVa of FIG. 13.
Figure 14B:
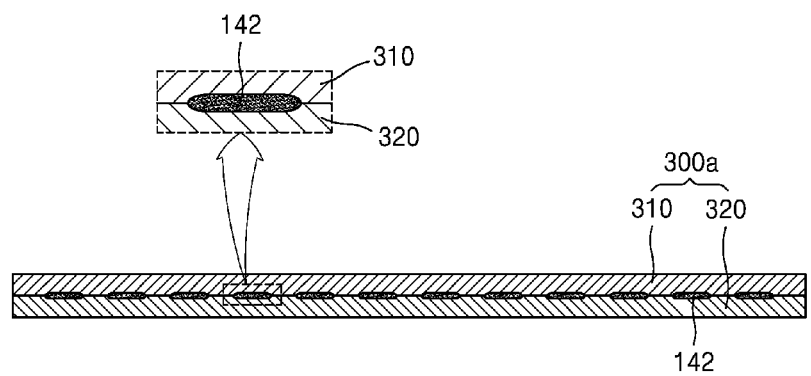
FIG. 14B is a cross-sectional view showing a state in which first and second sealing members of FIG. 14A are in elastic contact with each other.
Figure 15A:
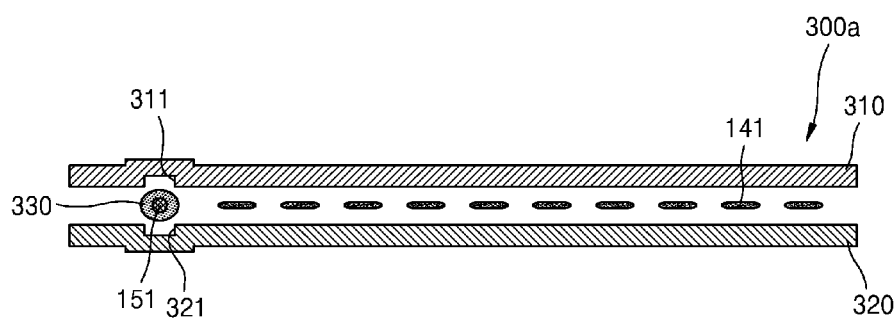
FIG. 15A is a cross-sectional view taken along a line XVa-XVa of FIG. 13.
Figure 15B:
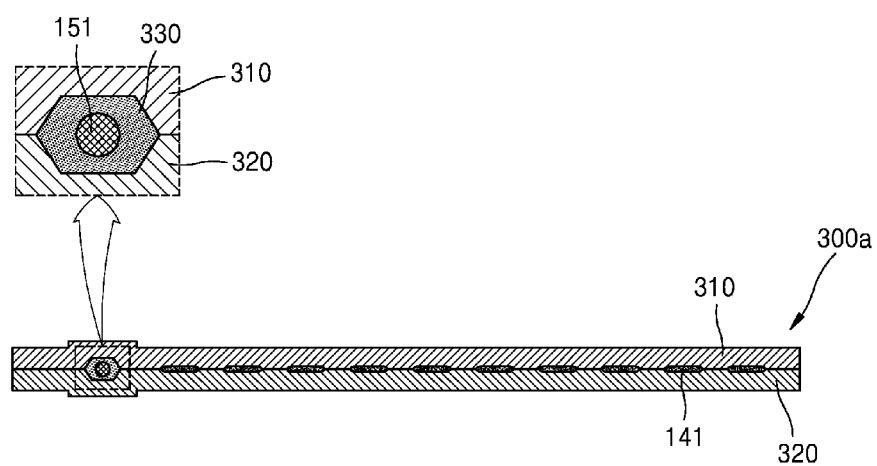
FIG. 15B is a cross-sectional view showing a state in which first and second sealing members of FIG. 15A are in elastic contact with each other.

FIG. 13 is a perspective view of the radiation detector 10, which shows an example of a detailed structure of the sealing part 300a of FIG. 12. FIG. 14A is cross-sectional view taken along line XIVa-XIVa of FIG. 13, and FIG. 14B is a cross-sectional view showing a state in which first and second sealing members of FIG. 14A are in elastic contact with each other. FIG. 15A is a cross-sectional view taken along line XVa-XVa of FIG. 13, and FIG. 15B is a cross-sectional view showing a state in which first and second sealing members of FIG. 15A are in elastic contact with each other.

Referring to FIG. 13, the driving ICs 141 and 142, e.g., a plurality of gate drivers and a plurality of readout circuits, are connected to the array substrate 110. Although not shown in FIG. 13, the driving ICs 141 are connected to gate lines GL coupled to TFTs included in the array substrate 110, and the driving ICs 142 are connected to data lines DL coupled to the TFTs. Although not shown in FIG. 13, the driving ICs 141 and 142 are also electrically connected to a mainboard.

The connection wire 151 is connected to the second electrode 120. Although not shown in FIG. 13, the connection wire 151 is electrically connected to the current detector 210 and the voltage source 140.

Referring to FIGS. 14A, 14B, 15A, and 15B the driving ICs 141 and 142 are disposed between the first and second sealing members 310 and 320 with at least a portion thereof exposed out of the sealing part 300a, as shown in FIG. 13. The first and second sealing members 310 and 320 may be formed of an elastic material so as to tightly contact the driving ICs 141 and 142. For example, the first and second sealing members 310 and 320 may include silicone.

With the driving ICs 141 and 142 disposed between the first and second sealing members 310 and 320, the first and second sealing members 310 and 320 are brought tightly into contact with each other. Since the first and second sealing members 310 and 320 are formed of an elastic material, regions of the first and second sealing members 310 and 320 that tightly contact the driving ICs 141 and 142 are elastically deformed to prevent the formation of a gap between the driving ICs 141 and 142 and the sealing part 300a. Thus, even though the driving ICs 141 and 142 pass through the sealing part 300a from the outside and is connected to the array substrate 110, it is possible to prevent decomposed matter DM generated in the photoconductive layer 130 from leaking out.

If the driving ICs 141 and 142 are not exposed out of the sealing part 300a but disposed inside the sealing part 300a, the inside of the sealing part 300a may be overheated by the driving ICs 141 and 142. The readout circuits such as the driving ICs 141 and 142 may be heated to about 80° C. However, according to the present exemplary embodiment, by having the driving ICs 141 and 142 protrude out of the sealing part 300a, it is possible to prevent overheating of the photoconductive layer 130 while sealing the photoconductive layer 130.

Referring to FIGS. 15A and 15B, the connection wire 151 is disposed between the first and second sealing members 310 and 320 and exposed out of the sealing part 300a. The first and second sealing members 310 and 320 may be formed of an elastic material to tightly contact the connection wire 151. For example, the first and second sealing members 310 and 320 may include silicone.

With the connection wire 151 disposed between the first and second sealing members 310 and 320, the first and second sealing members 310 and 320 are brought tightly into contact with each other. Since the first and second sealing members 310 and 320 are formed of an elastic material, regions of the first and second sealing members 310 and 320 that are in contact with the connection wire 151 are elastically deformed.

The first and second sealing members 310 and 320 may respectively have inserting grooves 311 and 321 for receiving at least a portion of the connection wire 151. The inserting grooves 311 and 321 may be formed at a position corresponding to the connection wire 151. The inserting grooves 311 and 321 may be formed in both of the first and second sealing members 310 and 320, but are not limited thereto. The inserting grooves 311 and 321 may be formed in either one of the first and second sealing members 310 and 320.

The sealing part 300a may further include a sub-sealing member 330 that is disposed between the first and second sealing members 310 and 320 and surrounds the connection wire 151.

The sub-sealing member 330 may be formed of an elastic material to tightly contact the first and second sealing members 310 and 320 and the connection wire 151. The sub-sealing member 330 may be elastically deformed when pressed by the first and second sealing members 310 and 320. The sub-sealing member 330 may include silicone.

Due to the presence of the sub-sealing member 330 that is elastically deformed, it is possible to more securely prevent the formation of a gap around the connection wire 151 interposed between the first and second sealing members 310 and 320. Thus, even if a diameter of the connection wire 151 increases to greater than or equal to about 1 mm, it is possible to prevent the formation of a gap around the connection wire 151.

As described above, the radiation detector 10 according to the exemplary embodiments may include the voltage controller 200 and the sealing part 300 or 300a. This configuration may securely prevent damage that may occur when overcurrent flows through the photoconductive layer 130.

The voltage controller 200 may suppress generation of decomposed matter DM in the photoconductive layer 130 by preventing or reducing an overcurrent flowing through the photoconductive layer 130. When the decomposed matter DM is generated in the photoconductive layer 130 despite control by the voltage controller 200, the sealing part 300 or 300a may block external leakage of the decomposed matter DM.

If the radiation detector 10 includes only the voltage controller 200 without the sealing part 300 or 300a, the decomposed matter DM may leak out. For example, the voltage controller 200 may malfunction or fail to function properly due to environmental factors. In this case, the overcurrent may flow through the photoconductive layer 130, resulting in generation of decomposed matter DM. As another example, even if the voltage controller 200 functions properly, overcurrent may flow in a region of the photoconductive layer 130. In other words, even if the total current of the photoconductive layer 130 is in the range of allowable current, overcurrent exceeding the allowable current may flow partially in a region of the photoconductive layer 130. This may cause generation of decomposed matter M in the photoconductive layer 130.

If the radiation detector 10 includes only the sealing part 300 or 300a without the voltage controller 200, burning of the photoconductive layer 130 cannot be prevented, and reliability of the product may be degraded. For example, if overcurrent continues to flow in the photoconductive layer 130, the number of regions of the photoconductive layer 130 which undergo a change in physical properties increases as described above, and thus the amount of decomposed matter DM generated increases. If the amount of generated decomposed matter DM exceeds a range that can be sealed by the sealing part 300 or 300a, the decomposed matter DM may leak out. Furthermore, if the overcurrent continues to flow in the photoconductive layer 130, the photoconductive layer 130 may be burnt.

However, according to the present exemplary embodiment, the voltage controller 200 may primarily prevent damage that may occur when an overcurrent flows through the photoconductive layer 130 by suppressing flow of the overcurrent in the photoconductive layer 130. Furthermore, the sealing part 300 or 300a may prevent damage due to the overcurrent in the photoconductive layer 130 by blocking leakage of the decomposed matter DM. In other words, by preventing damage due to the overcurrent by performing two-stage control, the reliability of the product may be enhanced.

Figure 16:
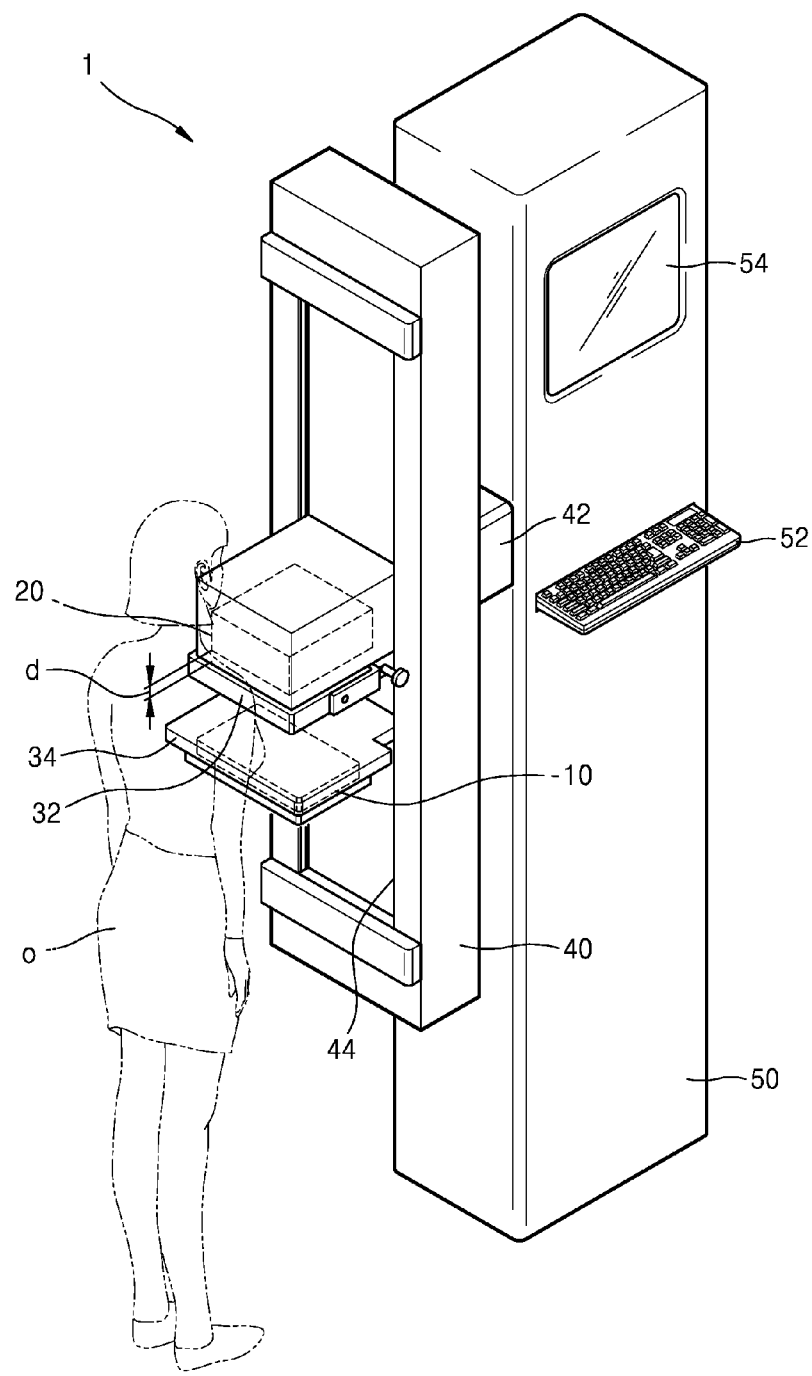
FIG. 16 illustrates a radiation imaging apparatus including a radiation detector, according to an exemplary embodiment.

FIG. 16 illustrates the radiation imaging apparatus 1 including a radiation detector 10, according to an exemplary embodiment. The radiation imaging apparatus 1 is a mammographic apparatus for capturing an image of a breast. However, exemplary embodiments are not limited thereto, and the radiation imaging apparatus 1 may be any radiation imaging apparatus for capturing an image of an object O using radiation.

Referring to FIG. 16, the radiation imaging apparatus 1 includes the radiation detector 10 according to the exemplary embodiments that detects radiation that has passed through the object O.

The radiation imaging apparatus 1 may include a radiation generator 20 for emitting radiation and first and second panels 32 and 34 that are configured to tightly contact the object O. The radiation imaging apparatus 1 may further include a gantry 40 for supporting the radiation generator 20, the radiation detector 10, and the first and second panels 32 and 34 and a main body 50 for supporting the gantry 40.

The main body 50 may include a user input unit 52 for inputting a user command so that the radiation imaging apparatus 1 may operate according to the user command, a signal processor (not shown) for generating an image corresponding to projected radiation, a display 54 for displaying a generated image, and a controller (not shown) for controlling overall operations of the radiation imaging apparatus 1. However, the user input unit 52, the signal processor, the display 54, and/or the controller may be formed as external devices that can communicate with the radiation imaging apparatus 1 by wire or wirelessly.

The gantry 40 may be fixed to the main body 50 via a gantry driver 42. The gantry 40. The gantry 40 may be located longitudinally on one side surface of the main body 50. The gantry driver 42 may rotate the gantry 40 by 360° or at a certain angle. In addition, the gantry driver 42 may operate to move the gantry 40 up and down longitudinally with respect to the main body 50. Thus, the gantry driver 42 may move the gantry 40 up or down along a longitudinal direction of the main body 50 in such a manner as to adjust a height of the gantry 40 based on the object O, and rotate the gantry 40.

The first and second panels 32 and 34 may be disposed on a front side of the gantry 40. The first and second panels 32 and 34 may move up and down along a guide groove 44 that is formed longitudinally in the front side of the gantry 40. Thus, if the object O, e.g., a patient's breast, is placed between the first and second panels 32 and 34, at least one of the first and second panels 32 and 34 may press the object O to compress it. For example, the second panel 34 may move up or down so that the object O may rest on the second panel 34, and then the first panel 32 may move down to press the object O and compress it.

The radiation generator 20 for generating radiation may be disposed on the first panel 32. The radiation generator 20 may be moved toward or away from the object O while maintaining a distance d from the first panel 32. For example, the radiation generator 20 may be formed integrally with the first panel 32 so that the radiation generator 20 and the first panel 32 may move together along the guide groove 44.

In detail, since the radiation generator 20 emits the X-ray on the object O when the first panel 32 presses the object O, a distance between the radiation generator 20 and the object O may be minimized. For example, the distance between the radiation generator 20 and the object O may be less than about 10 cm. Thus, it is possible to prevent emission of radiation to a region other than the object O, thereby minimizing exposure to the radiation. In order to minimize the distance between the radiation generator 20 and the object O, the radiation generator 20 may be disposed to contact an upper surface of the object O, such as the top side of a human breast.

The radiation detector 10 may be disposed below the second panel 34 to detect radiation that has passed through the object O. The radiation detector 10 may also be moved toward or away from the object O while maintaining a distance d from the second panel 34. For example, the radiation detector 10 may be integrated with the second panel 34 so that the radiation detector 10 and the second panel 34 move together along the guide groove 44.

As described above, the radiation detector and the radiation imaging apparatus including the same according to the one or more of the above-described exemplary embodiments include a voltage controller configured to control application of a voltage to a photoconductive layer based on current flowing in the photoconductive layer, thereby preventing or suppressing overcurrent from flowing in the photoconductive layer.

The radiation detector and the radiation imaging apparatus including the same according to one or more of the above-described exemplary embodiments also include a sealing part configured to hermetically seal the photoconductive layer, thereby preventing hazardous substances generated due to decomposition of material in the photoconductive layer from leaking out.

The foregoing exemplary embodiments and advantages are merely exemplary and are not to be construed as limiting the present teaching. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A radiation detector comprising:
a radiation detecting module including a photoconductive layer containing at least one heavy metal;
a voltage controller configured to detect current flowing through the photoconductive layer and to control application of a voltage to the photoconductive layer based on the detected current; and
a sealing part configured to seal the photoconductive layer and surround at least a portion of the radiation detecting module,
wherein the voltage controller comprises:
a current detector configured to detect the current flowing in the photoconductive layer, and
a voltage blocking unit configured to block the voltage supplied from the voltage source to be applied to the photoconductive layer in response to the detected current being greater than an allowable current, to prevent a generation of a decomposed matter due to an overcurrent greater than the allowable current,
wherein the sealing part is further configured to block the decomposed matter from leaking out, and
wherein the at least one heavy metal comprises at least one among mercury (Hg), cadmium (Cd), lead (Pb), titanium (Ti), and bismuth (Bi).

2. The radiation detector of claim 1, wherein the photoconductive layer comprises at least one among mercury(II) iodide ($HgI_2$), lead(II) iodide ($PbI_2$), lead(II) oxide (PbO), cadmium telluride (CdTe), cadmium zinc telluride (CdZnTe), cadmium sulfide (CdS), titanium bromide (TiBr), bismuth triiodide ($BiI_3$), and any combination thereof.

3. The radiation detector of claim 1, wherein the decomposed matter is generated due to decomposition of material in the photoconductive layer, from leaking out.

4. The radiation detector of claim 3, wherein the decomposed matter comprises at least one among Hg, Cd, Pb, Ti, and Bi.

5. The radiation detector of claim 1, wherein the radiation detecting module further comprises:
an array substrate that is disposed on one side of the photoconductive layer and includes a plurality of first electrodes; and
a second electrode that is disposed on another side of the photoconductive layer to face the array substrate.

6. The radiation detector of claim 5, wherein the photoconductive layer comprises:
a first surface having the second electrode disposed thereon;
a second surface having the array substrate disposed thereon; and
side surfaces connecting the first surface and the second surface,
wherein the sealing part surrounds the side surfaces of the photoconductive layer.

7. The radiation detector of claim 5, wherein the array substrate comprises:
a first surface having the photoconductive layer disposed thereon;
a second surface opposite the first surface; and
side surfaces connecting the first surface and the second surface,
wherein the sealing part surrounds the side surfaces and the second surface of the array substrate.

8. The radiation detector of claim 5, wherein the second electrode comprises:
a second surface having the photoconductive layer disposed thereon;
a first surface opposite the second surface; and
side surfaces connecting the first surface and the second surface,
wherein the sealing part surrounds the side surfaces of the second electrode.

9. The radiation detector of claim 5, wherein the sealing part comprises:
a first sealing member configured to surround the photoconductive layer; and
a second sealing member that is in elastic contact with the first sealing member and surrounds at least a portion of the array substrate.

10. The radiation detector of claim 9, further comprising a driving integrated circuit (IC) that is connected to the array substrate and disposed between the first sealing member and the second sealing member,
wherein at least one among the first sealing member and the second sealing member is formed of an elastic material which contacts the driving IC.

11. The radiation detector of claim 9, further comprising a connection wire that is connected to the second electrode and disposed between the first sealing member and the second sealing member,
wherein at least one among the first sealing member and the second sealing member is formed of an elastic material which contacts the connection wire.

12. The radiation detector of claim 9, wherein each of the first sealing member and the second sealing member comprises silicone.

13. The radiation detector of claim 1, wherein the radiation detector comprises an X-ray detector or a γ-ray detector.

14. A radiation imaging apparatus comprising:
a radiation generator configured to emit radiation toward an object; and the radiation detector of claim 1, the radiation detector being disposed to face the radiation generator with the object interposed therebetween, and configured to detect radiation that has passed through the object.

15. The radiation detector of claim 1, wherein the voltage controller further comprises:
a current determiner which is electrically connected to the current detector to receive a value of the detected current, and configured to compare the value of the detected current with the allowable current and output a comparison result,
wherein the current detector is electrically connected between a voltage source and the voltage blocking unit and is further configured to receive the comparison result from the current determiner, and is electrically connected between the voltage source and a ground terminal, to prevent the voltage source to apply the voltage to the photoconductive layer, in response to the detected current being greater than the allowable current, the allowable current being a product of an allowable current density of the photoconductive layer and an area of the photoconductive layer.

16. A radiation detector comprising:
a radiation detecting module including:
a photoconductive layer containing at least one metal;
a voltage controller including:
a current detector configured to detect current flowing in the photoconductive layer, and
a voltage blocking unit configured to block voltage from being applied to the photoconductive layer based on the current detected by the current detector; and
a sealing part configured to seal the photoconductive layer and surround at least a portion of the radiation detecting module,
wherein the voltage blocking unit is configured to block the voltage from being applied to the photoconductive layer in response to the detected current being greater than an allowable current,
wherein the allowable current is a product of an allowable current density of the photoconductive layer and an area of the photoconductive layer, and
wherein the allowable current density of the photoconductive layer is less than or equal to 10 microamperes per square centimeter ($\mu A/cm^2$).

17. A radiation detector comprising:
a radiation detecting module including:
a photoconductive layer containing at least one metal;
a voltage controller configured to detect current flowing through the photoconductive layer and to control application of a voltage to the photoconductive layer based on the detected current; and
a sealing part configured to seal the photoconductive layer and surround at least a portion of the radiation detecting module,
wherein the sealing part comprises:
a first sealing member configured to surround the photoconductive layer; and
a second sealing member that is in elastic contact with the first sealing member,
wherein the radiation detector further comprises a connection wire that is connected to an electrode which is disposed on one side of the photoconductive layer and disposed between the first sealing member and the second sealing member, and
wherein the sealing part further comprises a sub-sealing member that is disposed between the first sealing member and the second sealing member, surrounds the connection wire, and is formed of an elastic material which contacts the first sealing member, the second sealing member, and the connection wire.

18. The radiation detector of claim 17, wherein the sub-sealing member comprises silicone.

* * * * *